March 18, 1952 J. TIMMERMAN 2,590,055
APPARATUS FOR MEASURING MUSCULAR STRENGTH
Filed June 28, 1946 3 Sheets-Sheet 3
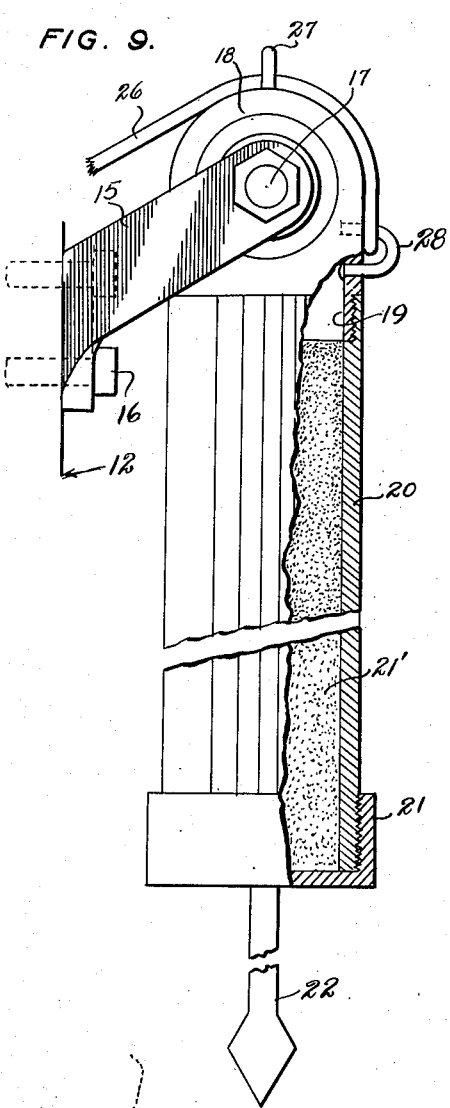
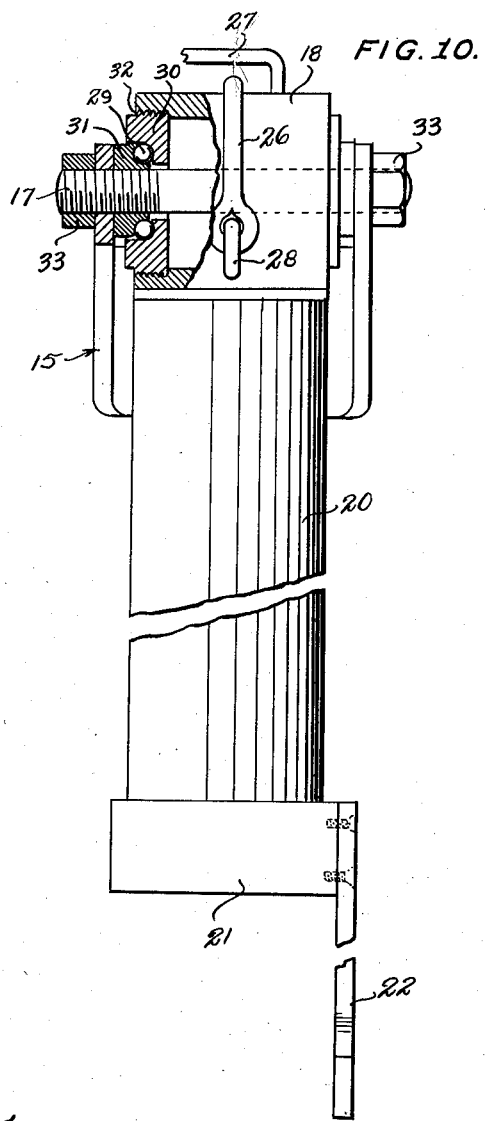
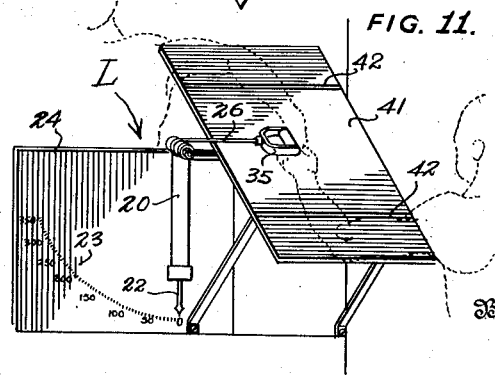
Inventor
JOHANNES TIMMERMAN, Patented Mar. 18, 1952

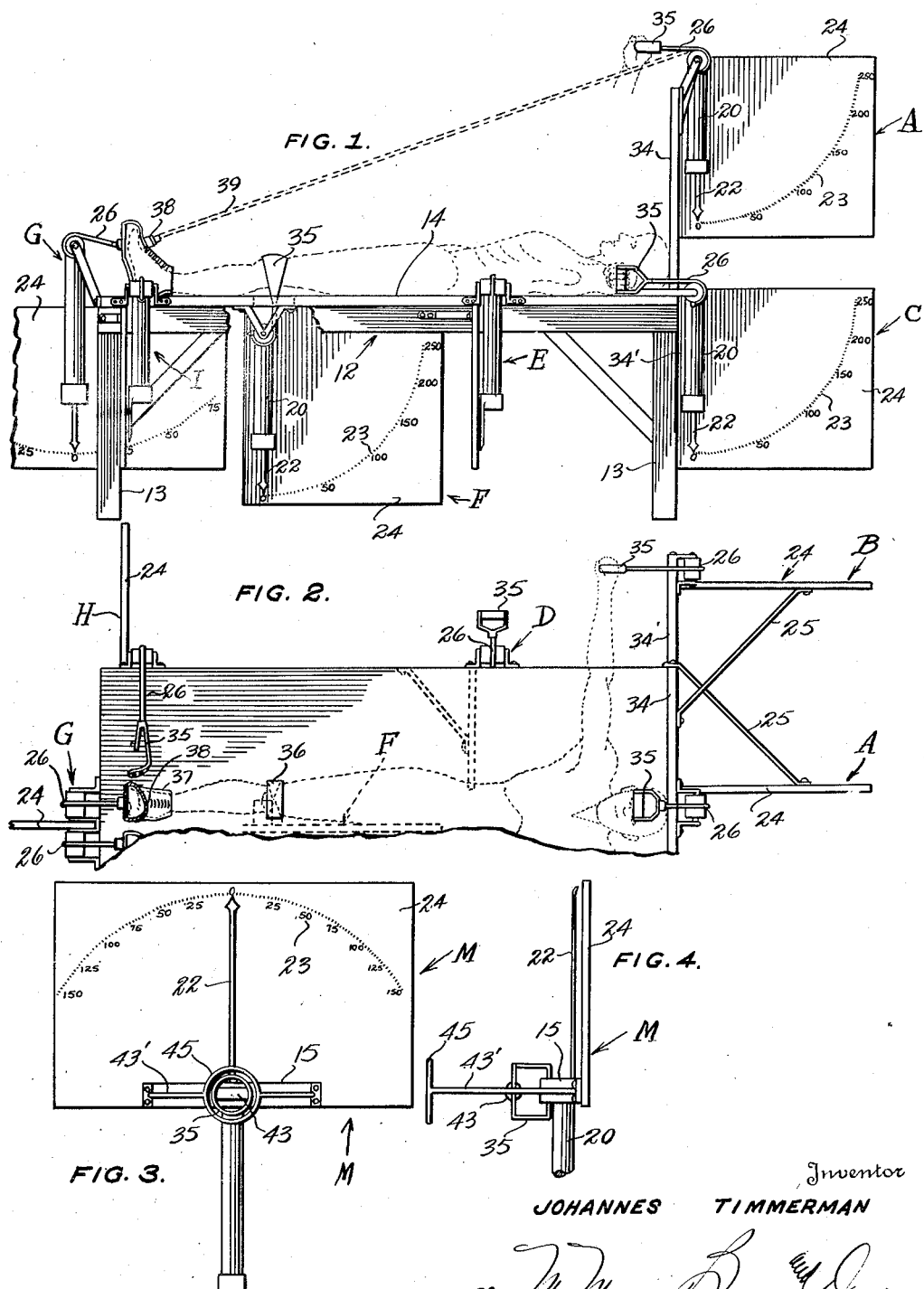

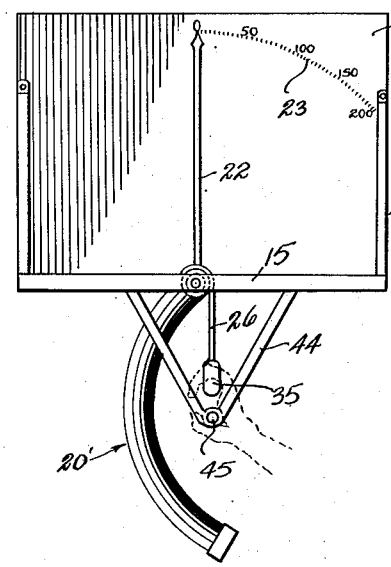
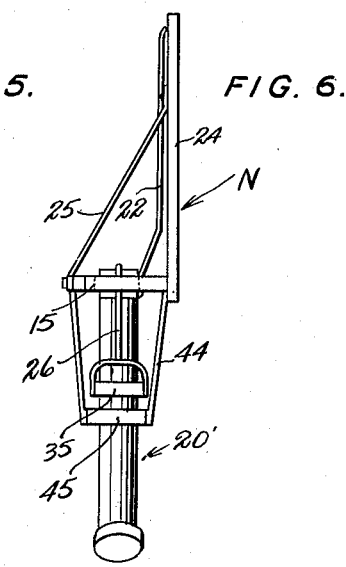
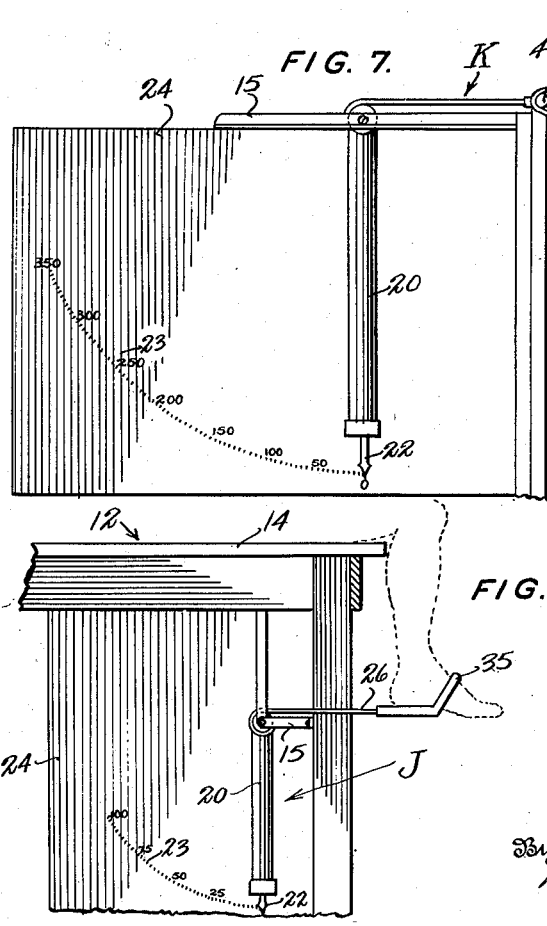
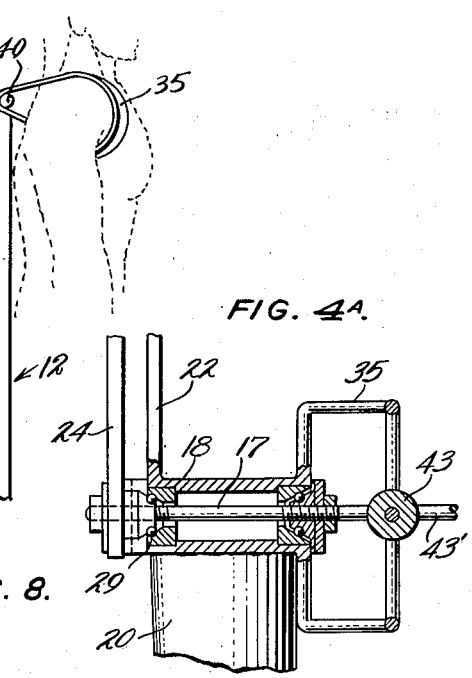

2,590,055

UNITED STATES PATENT OFFICE 2,590,055

APPARATUS FOR MEASURING MUSCULAR STRENGTH

Johannes Timmerman, Clifton, N. J.

Application June 28, 1946, Serial No. 680,006

5 Claims. (Cl. 73—379)

My invention relates to apparatus for testing the strength of the different sets of muscles of the human body, and the primary object of my invention is to provide simple and efficient means of this character especially adapted for ascertaining the progress in recovery of muscular strength made by persons convalescing from war or other injuries.

Other important objects and advantages of my invention will be apparent from the following description and the accompanying drawings, wherein merely for purposes of illustration, preferred embodiments of my invention are set forth in detail.

In the drawings:

Figure 1 is a side elevation of an arrangement according to this invention, involving a table having arranged thereon a plurality of testing units disposed so as to involve a minimum number of changes of position of the patient for the performance of a maximum number of strength tests of the various sets of muscles, with the patient being shown in phantom lines.

Figure 2 is a fragmentary top plan view of Figure 1.

Figure 3 is a front elevation of the forearm strength testing and indicating unit.

Figure 4 is a side or edge elevation thereof.

Figure 4a is a fragmentary transverse vertical section taken substantially centrally through Figure 3.

Figure 5 is a side elevation of a grip strength testing and indicating unit.

Figure 6 is an edge or rear elevation thereof.

Figure 7 is a side elevation of a shoulder pull strength unit for testing the strength of forward and rearward body bending.

Figure 8 is a side elevation of the unit for testing leg action.

Figure 9 is a side elevation on an enlarged scale and partly broken away, of the pendulum weight of the units.

Figure 10 is a view at right angles to Figure 9, and

Figure 11 is a perspective view of a unit for testing arm flexion and extension.

Referring in detail to the drawings, the numeral 12 generally designates suitable support, such as a table-like structure, with which the various muscle strength testing and indicating devices or units may conveniently be associated for singular and combined utilization.

The table 12 has legs 13 at its corners, and for convenience its top 14 may be about 8 feet long and 4 feet wide.

All of the testing and indicating devices associated with the table 12 involve various arrangements of similar components, comprising (with reference particularly to Figures 9 and 10) a U-shaped bracket 15 provided with bolts 16 through its bight portion for attachment to an appropriate part of the table 12, with a pivot bolt or axle 17 carried between the outer ends of the arms of the bracket, on which is swingably mounted the generally cylindrical head 18, which has a depending neck 19 threaded into the upper end of a depending hollow pendulum cylinder 20, which has a cap 21 threaded on the lower end, to hold within the cylinder a selected amount of suitable weighing material 21', such as sand.

One side of the cap 21 has a depending pointer 22 parallel with the axis of the cylinder 20, for pointing to numerals on an arcuate scale 23, graduated in pounds, and concentric with the pivot 17 and executed in a suitable manner on a scale panel 24, having suitable means 25 for mounting the panel on the table 12.

The form of testing and indicating device shown in Figures 5 and 6 differs from that described above, in that the pendulum cylinder 20-a is downwardly curved instead of being straight to provide clearance for the performance of the testing operation for which this form is adapted.

The devices have further in common a cord or cable 26 trained over the cylindrical head 18 through a relatively wide guide loop 27 on the top of the cylinder, with the adjacent end of the cord tethered to a loop 28 on the lower side portion of the head 18. Each cord terminates in a handle or stirrup 35.

As shown in Figure 10, the head 18 is supported on the pivot bolt 17 by means of ball bearings 29, each of which includes a retainer ring and race 30 threaded into the head, and a bearing cone 31 with suitable balls 32, the arms of the bracket 15 and the cones being retained on the bolt by nuts 33.

Referring to Figures 1 and 2 of the drawings, attached to the head end of the table 12 is a wall-like riser or head-board 34, from which projects at right angles and on the center line of the table 12, the scale panel 24 of testing and indicating device A which is braced by the mounting 25 above the top of the table. Mounted on extensions 34 on opposite sides of the head of the table are devices B and C with their scale panels 24 projecting parallel with the panel of device A, on a level below the top of the table 12.

At points at the opposite side edges of the table spaced from the head of the table are devices D and E, with their scale panels 24 supported transversely beneath the table top 14.

To the left of the devices D and E, as seen in Figures 1 and 2, there is supported beneath the table top a single device F, with its scale panel 24 arranged in a vertical longitudinal position, the table top 14 being formed with an opening 36 to pass the cord or cable 26 with its foot stirrup 35.

A dual device which is mounted on the foot of the table includes the single double-faced scale panel 24, with pendulum mechanisms on each side thereof, the panel projecting longitudinally from the table below the top 14 on the middle or center line of the table, as shown in Figure 2.

On each side of the foot of the table 12 are similar devices H and I, respectively, with their scale panels 24 projecting laterally from the table below the top 14, and provided on their cables with foot stirrups 35.

In the case of the device G, special shoes 37 take the places of the foot and hand stirrups 35, to which the cables 26 are attached at the ball of the sole of the shoes, the vamps of the shoes having eyes 38 to which are attached cables 39 which can be trained over the head of the pendulum of the device A, when the cable of the device G is disconnected.

Another device J may be mounted below the table top 14, as indicated in Figure 8, with its scale panel projecting under the table, and with its cable 26 provided with a foot stirrup 35.

In Figure 7 is shown another device K which may be supported on a suitable portion of the table 12 by a modified bracket, with the cable 26 provided with a cross-bar 40, on each end of which is secured a shoulder stirrup 35.

A generally similarly arranged device L, shown in Figure 11, may have associated therewith, at one side thereof, an horizontal rest board 41 with transverse cleats 42 spaced from adjacent ends thereof, for supporting a patient's arms in the two positions indicated in phantom lines.

Another arrangement may be provided in the device M, shown in Figures 3, 4 and 4a, in which the scale panel 24 is above the pendulum cylinder 20, with the pointer 22 projecting upwardly from the cylinder. In this case the modified bracket 15 is arranged to permit the pendulum to swing in a plane parallel to the scale panel, with a rotary hand stirrup 35 provided with a cross grip 43, connected to swing the pendulum to opposite sides on its pivot 17. An extension 43' of the stirrup has a forearm receiving ring 45.

In Figures 5 and 6 is shown another form of device N, with an arrangement similar to the device M of Figures 3 and 4, but provided with a depending hand stirrup 35 and a curved pendulum cylinder 20', which curves away from the position of the stirrup to afford proper clearance therefrom. A stationary transverse hand grip 45 for cooperation with the hand stirrup 35 is rigidly supported by pairs of converging arms 44 depending from the modified mounting bracket 15.

The test purposes for which the various devices are employed are as follows:

A. Hyperextension of the arm and also used for plantar flexion of the ankle.
B. Adduction right arm.
C. Adduction left arm.
D. Abduction right arm.
E. Abduction left arm.
F. Flexion in the hip, also used for extension in the hip, anterior flexion in the shoulders, and flexion in the knee.
G. Dorsal flexion in the ankle.
H. Abduction left leg and adduction right leg.
I. Abduction right leg and adduction left leg.
J. Extension in the knee.
K. Forward bending and backward bending.
L. Flexion and extension in the elbow.
M. Supination and pronation of the forearm.
N. Flexion of the fingers (grip).

I claim:

1. Apparatus for testing and measuring muscular strength of body members, comprising a bracket, an axle on said bracket, a weighted pendulum having a head on its upper end journalled on said axle, a pointer projecting longitudinally from said pendulum, a scale panel having thereon an arcuate scale concentric with said axle and along which said pointer is adapted to move, and a stirrup equipped cable trained over said head of the pendulum from one side thereof and secured to the other side, the pull of a body member applied to said stirrup being adapted to swing said pendulum away from normal position so that its pointer indicates on said scale the degree of pull exerted upon the stirrup in a direction away from said one side of the head, said pendulum comprising an arcuate body curved laterally outwardly from the perpendicular plane in which said axle lies.

2. In an apparatus for measuring the muscular strength of a body member, a support, a bracket secured to said support having an axle, an elongated weighted pendulum having a head on one end, said head being cylindrical with its axis arranged crosswise of said pendulum, said head being axially journaled on said axle, a pointer on and projecting longitudinally beyond the other end of said pendulum, a scale panel on said support having an arcuate scale concentric with said axle and along which said pointer is adapted to move when said pendulum is swung to one side of a substantially perpendicular starting position, a relatively short cable having an end portion secured to one side of said head and trained over said pendulum head beyond the opposite side of said head, said cable being otherwise unsupported, and a stirrup secured to the other end of said cable, the measure of a pull of a body member on said stirrup sufficient to swing said pendulum out of its perpendicular starting position being indicated by said pointer on said scale.

3. In an apparatus for measuring the muscular strength of a body member, a support, a bracket secured to said support having an axle, a vertically elongated weighted pendulum having a head on its upper end journaled on said axle, a pointer on and projecting longitudinally beyond one end of said pendulum, a scale panel on said support having an arcuate scale concentric with said axle and along which said pointer is adapted to move when said pendulum is swung to one side of a substantially perpendicular starting position, a relatively short cable having one end thereof trained over said pendulum head from one side of said head with the other end of said cable secured to the opposite side of said head, said cable being otherwise unsupported, and a stirrup secured to the other end of said cable, the measure of a pull of a body member on said stirrup sufficient to swing said pendulum out of its perpendicular starting position being indicated by said pointer on said scale, said pendulum comprising a hollow cylinder, means closing the lower end of said cylinder, said head being removably secured to and closing the upper end of said pendulum, and a body of weighting material within said cylinder.

4. In an apparatus for measuring the muscular strength of a body member, a support, a bracket secured to said support having an axle, a vertically elongated weighted pendulum having a head on its upper end journaled on said axle, a pointer on and projecting longitudinally beyond one end of said pendulum, a scale panel on said support having an arcuate scale concentric with said axle and along which said pointer is adapted to move when said pendulum is swung to one side of a substantially perpendicular starting position, a relatively short cable having one end thereof trained over said pendulum head from one side of said head with the other end of said cable secured to the opposite side of said head, said cable being otherwise unsupported, and a stirrup secured to the other end of said cable, the measure of a pull of a body member on said stirrup sufficient to swing said pendulum out of its perpendicular starting position being indicated by said pointer on said scale, said pendulum head comprising a tubular cylinder concentrically spaced from and circumposed on said axle, said tubular cylinder having open ends, and ball bearings journalling said tubular cylinder on said axle, said ball bearings having outer races secured in said open ends, inner races circumposed on said axle, and balls confined between and rotatably connecting said outer and inner races.

5. In an apparatus for measuring the muscular strength of a body member, a bracket having an axle thereon, a vertically elongated weighted pendulum having a head on its upper end journaled on said axle, said pendulum thereby normally occupying a dependent perpendicular starting position, a scale panel on said support having an arcuate scale concentric with said axle, a pointer projecting longitudinally from said pendulum across said scale panel, a stirrup, means operatively connecting said stirrup to said pendulum head to which force is adapted to be applied by a body member whereby said pendulum is swung to one side of its perpendicular starting position and the position of said pointer relative to said scale indicates the measure of muscular force applied, said means being directly connected to the pendulum head at one side thereof and trained over the head to the opposite side thereof and beyond.

JOHANNES TIMMERMAN.

REFERENCES CITED

The following references are of record in the file of this patent:

UNITED STATES PATENTS

| Number | Name | Date |
|---|---|---|
| 167,137 | Tiebout | Aug. 24, 1875 |
| 321,388 | Ruebsam | June 30, 1885 |
| 435,180 | Howe | Aug. 26, 1890 |
| 826,822 | Aker | July 24, 1906 |
| 963,890 | Haas | July 12, 1910 |
| 2,309,511 | Kellogg | Jan. 26, 1943 |
| 2,413,166 | Bowman | Dec. 24, 1946 |

FOREIGN PATENTS

| Number | Country | Date |
|---|---|---|
| 472,444 | Germany | Feb. 28, 1929 |